United States Patent [19]
Mitchell

[11] Patent Number: 4,583,894
[45] Date of Patent: Apr. 22, 1986

[54] HIGH SPEED MOTORIZED SPINDLE WITH TOOL CLAMPING/UNCLAMPING MECHANISM

[75] Inventor: William A. Mitchell, Springfield, Vt.

[73] Assignee: Ex-Cell-O Corporation, Troy, Mich.

[21] Appl. No.: 627,323

[22] Filed: Jul. 2, 1984

[51] Int. Cl.⁴ ............................................. B23B 5/26
[52] U.S. Cl. .................................. 409/233; 408/57; 408/239 A; 29/568
[58] Field of Search .................. 408/57, 239, 239 A; 409/233, 232; 29/568

[56] References Cited

U.S. PATENT DOCUMENTS

| | | | |
|---|---|---|---|
| 4,011,791 | 3/1977 | Lanzenberger | 409/233 |
| 4,026,191 | 5/1977 | Blomquist | 409/233 |
| 4,068,559 | 1/1978 | Schmid et al. | 409/233 |
| 4,148,246 | 4/1979 | Johnson et al. | 409/233 |
| 4,303,360 | 12/1981 | Cayen et al. | 409/233 |
| 4,409,721 | 10/1983 | Tomita et al. | 409/233 |

Primary Examiner—Donald R. Schran
Attorney, Agent, or Firm—Edward J. Timmer

[57] ABSTRACT

A high speed motorized spindle is provided with a hollow tool-driving shaft having tool clamping means slidably disposed therein. A piston rod actuates the tool clamping means to slide in one direction to release a tool shank and spring means actuates the tool clamping means to slide in the other direction for gripping the tool shank when the piston rod is withdrawn. The piston rod actuates a collect clamp to clamp the tool-driving shaft against movement from tool unclamping forces when the tool clamping means is slid in the direction to release the tool shank. The tool-driving shaft is releasably oriented in a tool exchange position by a cam plate rotatable therewith being engaged by solenoid actuated cam lock member movably mounted in the housing.

23 Claims, 4 Drawing Figures

HIGH SPEED MOTORIZED SPINDLE WITH TOOL CLAMPING/UNCLAMPING MECHANISM

FIELD OF THE INVENTION

The present invention relates to spindles for material cutting operations and, in particular, high speed spindles having a self-contained clamping/unclamping mechanism to facilitate tool changing and to tool clamping/unclamping methods.

BACKGROUND OF THE INVENTION

High speed motorized spindles were initially developed for precision grinding and over the years have been used for other machining operations involving heavy stock removal such as rotary milling, end milling and end facing. Such high speed spindles have been used in conjunction with machining centers having multiple tool storage and tool changer mechanisms for exchanging one type of tool for another on the prime spindle of the machining center. U.S. Pat. No. 3,803,981 issued Apr. 16, 1974 to Allgeyer illustrates a sub-spindle mounted in a prime spindle. Similarly, U.S. Pat. No. 4,077,736 describes an electric motor driven drill in the toolholder of a machine tool.

There is a need to provide a high speed spindle with a self-contained or built-in tool clamping/unclamping mechanism so that an individual tool chucked in the high speed spindle can be readily exchanged with another tool, especially one for use as an auxiliary high speed spindle loaded into the prime spindle of a machining center application.

Typical prior art high speed spindle constructions are illustrated in the Moore U.S. Pat. No. 2,502,874 issued Apr. 4, 1950, the Arms U.S. Pat. No. 2,523,983 issued Sept. 26, 1950, the Bryant et al. U.S. Pat. No. 2,550,908 issued May 1, 1951 and the Grobey U.S. Pat. No. 2,819,127 issued Jan. 7, 1958, the Mitchell et al. U.S. Pat. No. 3,929,944 issued Feb. 24, 1976 and the Mitchell U.S. Pat. No. 4,211,454 issued July 8, 1980.

SUMMARY OF THE INVENTION

The present invention contemplates a spindle having a tool clamping means slidably disposed in a hollow tool-driving shaft slidable in one direction to release a tool shank and in the other direction to grip the tool shank and actuating means in the housing for slidably actuating the tool clamping means. Importantly, the actuating means includes piston means slidably disposed in the housing for engaging and sliding the tool clamping means in the tool-driving shaft. Preferably, the spindle includes means operable in response to movement of the piston means relative to the tool-clamping means for releasably clamping the tool-driving shaft against movement. The spindle also preferably includes means to lock the rotary position of the tool-driving shaft when the tool-clamping means is released to thereby facilitate tool exchange.

In a typical working embodiment of the invention, the spindle includes spring means in the hollow tool-driving shaft biasing the drawbar member of the tool clamping means in a direction to cause multiple fingers on a tool clamping collet connected to the working end of the drawbar member to be cammed to grip the tool shank. The piston means includes a piston rod extending into the rear non-working end of the tool-driving shaft engageable end-to-end with the drawbar member when the piston is slid in the other direction to cause the collet fingers to open or release the tool shank. As the piston rod engages the drawbar member, cam surfaces on the piston rod expand multiple collet fingers of the shaft clamping collet into an internal groove in the tool-driving shaft and the collet fingers are caused to grippingly engage the shaft to prevent movement thereof from the relatively large longitudinal or axial forces exerted thereon during tool shank release. The shaft clamping collet extends out of the tool-driving shaft and is mounted to a cylinder member which slidably receives the piston means and is itself slidable in the housing to cause the collet fingers to be in clamping or gripping engagement in the groove of the tool-driving shaft. The cylinder member is preferably spring biased to center the collet fingers relative to the groove of the tool-driving shaft when the latter is unclamped. The shaft clamping collet fingers are released from the shaft groove when the piston means is slid in the direction to allow the spring means to bias or slide the drawbar member in the tool gripping direction. The piston rod preferably carries a sensed member, the movement of which is sensed by a position sensor in the housing so that the position of the piston means between the tool release position and tool gripped position is known.

The hollow tool-driving shaft also includes in a preferred embodiment a cam means thereon and rotatable therewith for operative engagement by cam lock means movably mounted in the housing to thereby lock the shaft rotary position during tool exchange. The cam means may include one or more sensed members for sensing by a position sensor in the housing so that the rotary position of the shaft and tool-shank engaging flanges on the working end thereof are known for correct tool exchange. The spindle housing preferably includes a shank on one end thereof adapted to be received in the prime spindle of a machining center or machine tool. The working embodiment of the invention is especially useful in conjunction with a machining center as a result of the features described hereinabove. Method aspects of the invention are also disclosed.

DESCRIPTION OF PREFERRED EMBODIMENTS

Figure 1:
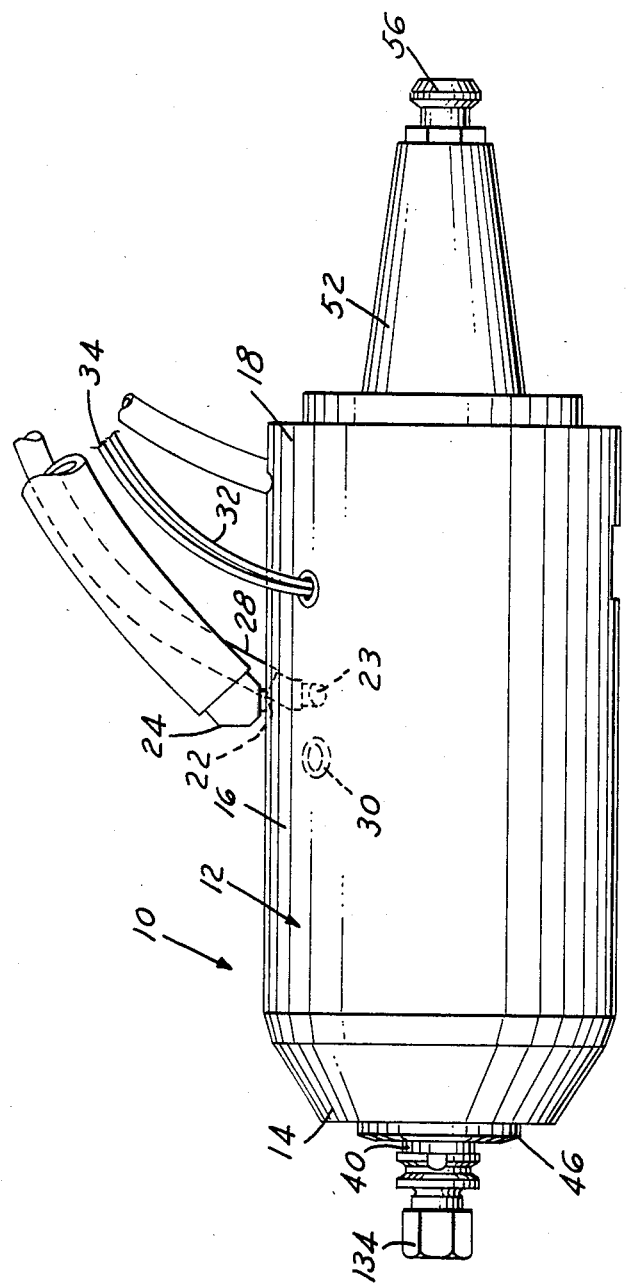
FIG. 1 is an elevation of a high speed motorized spindle of the invention.
Figure 2:
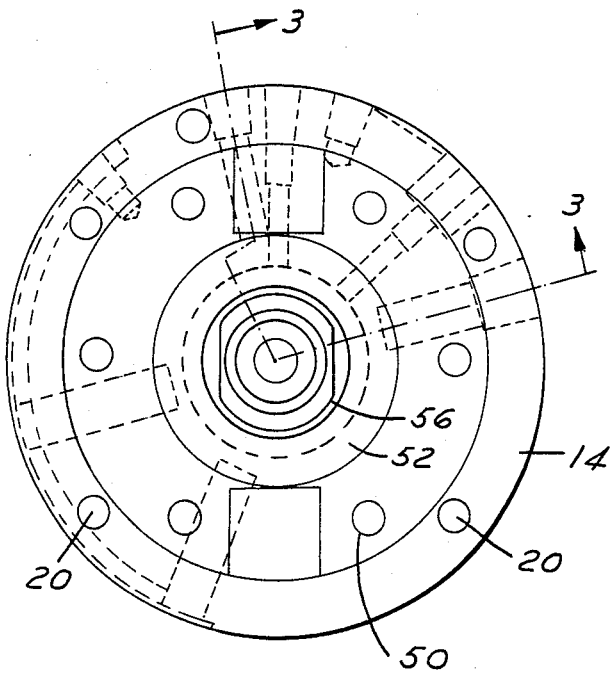
FIG. 2. is an end elevation of the working end of the spindle.

FIG. 1 illustrates a high speed motorized spindle 10 of the invention. The spindle includes a housing 12 comprised of a forward housing section 14, intermediate housing section 16 and rear housing section 18 fastened together by suitable means such as machine screws 20 illustrated for forward housing section 14 in FIG. 2. Attached to the housing are various connectors for coolant, lubrication and electrical power, and sensors used in the spindle. For example, oil mist inlet 22 and oil mist supply conduit 24 are provided for internal shaft bearings to be described. A coolant inlet 23 and coolant supply conduit 28 are provided for motor cooling. An electrical power cable is attached at 30 to the housing to supply motor current. Proximity sensor lead lines 32,34 are provided and connected to sensors described below.

Protruding through the forward housing section 14 is the forward or working end 40 of a hollow tool-driving shaft 70. A tool shank is clamped in the hollow shaft 70 as will be described in more detail hereinbelow. A bearing retainer nut 46 is also visible on the forward end of the spindle and is fastened by threads to the shaft 70 as shown shown in FIG. 3.

The rear end of the spindle 10 has a tapered shank 52 with an annular flange 54 attached to the rear housing section 18 as by machine screws (not shown) or other suitable means. The shank 52 is tapered so as to be receivable in a prime spindle (not shown) of known machining centers or machine tools. The shank terminates in a knob 56 threaded thereinto (FIG. 3) and adapted to be gripped by fingers of a clamping collet in the prime spindle in well known fashion. The spindle 10 is thus mountable in the prime spindle of a machining center or machine tool and the power, lubrication, coolant and control sensors can be connected to respective sources or control units external of the spindle.

Figure 4:
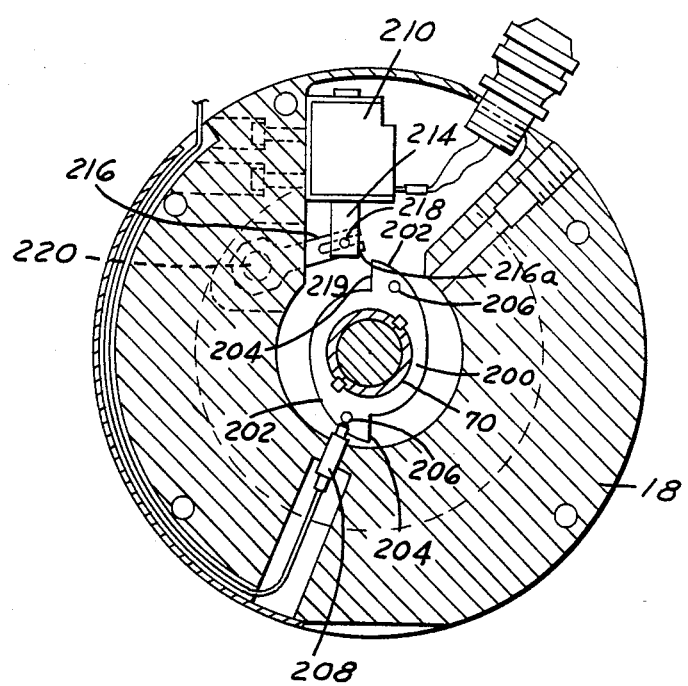
FIG. 4 is a cross-sectional view taken along lines 4—4 of FIG. 3.
Figure 3:
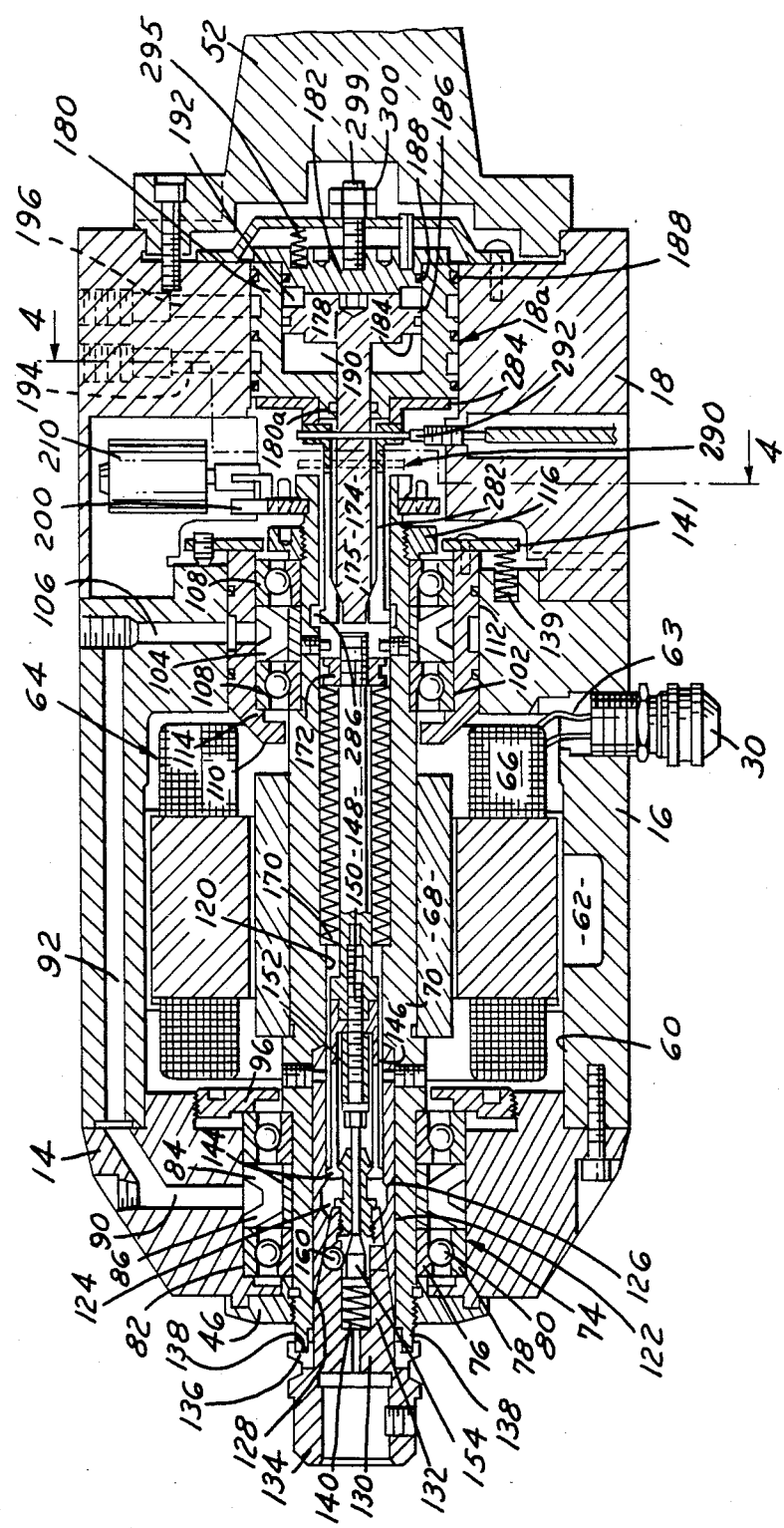
FIG. 3 is a cross-sectional view taken along lines 3—3 in FIG. 2

FIGS. 3 and 4 illustrate the internal features of the spindle 10. The intermediate housing section 16 includes a central large diameter bore 60 and an annular coolant passage 62. Coolant passage 62 receives coolant such as corrosion inhibited water from coolant supply conduit 28 for circulation around motor 64 for eventual discharge through a coolant discharge conduit (not shown) attached to the housing. As mentioned above, coolant is supplied from a coolant source (not shown) located exteriorly of the spindle 10. Received in the central bore 60 is a reversible electric motor 64 of the high frequency alternating current induction type which is cooled by circulating coolant confined in passage 62 out of contact of the motor and which receives electrical power via leads 63 extending from power cable 30. The motor speed and direction of rotation are controlled by a commercially available solid state variable frequency power supply 31 available from Volkman Corp. or other known sources. The motor typically includes a stator winding 66 supported (press fit) into bore 60 and a rotor winding 68 carried and affixed on rotatable hollow tool-driving shaft 70. The left-hand end or forward end of the tool-driving shaft is journaled in a pair of forward anti-friction bearings 74 each comprising an inner race 76, outer race 78 and balls 80 therebetween, in particular being journaled in inner races 76 thereof. The outer races 78 are supported in a cylindrical bore 82 in the forward housing section 14. Positioned between the bearings 74 is an oil-mist nozzle 84 having apertures 86 for providing a bearing mist from oil mist supply passage 90 connected to an external oil mist source (not shown) by means of longitudinal or axial passage 92. A high speed bearing arrangement having oil mist supplied from a blender-distributor unit or source is described in the Mitchell and Thayer U.S. Pat. No. 3,939,744 of common assignee herewith, the teachings of which are incorporated herein by reference. The bearings 74 are held between an inner collar 96 and outer collar 46 on the forward housing section 14 as shown.

The right-hand end or rear end of tool-driving shaft 70 is similarly journaled in a pair of anti-friction bearings 102 similar to those described above. Oil mist is provided by a nozzle 104 identical to that (84) described above for the forward bearings from a passage 106 connected to axial passage 92. The outer races 108 of the rear bearings are supported against a tubular rear bearing cage member 110 which in turn is supported in small diameter bore 112 in the intermediate housing section. As is apparent, rear bearings 102 are held between the radial flange 114 of the rear bearing cage member and a collar 116 threaded exteriorly onto the end of the tool-driving shaft 70.

Shaft bearings 74 and 102 are subjected an initial selected preload in the axial direction toward the right in FIG. 3 by means of multiple spacings 139 (only one shown) engaging a collar 141 attached such as by machine screws to rear bearing cage member 110 as shown.

The tool-driving shaft 70 is hollow and includes a longitudinal or axial bore 120 therethrough. The forward end of the bore 120 receives a shank-receiving sleeve 122 having a circumferential groove 124 with cam surfaces 126 and a tapered surface 128. A tool shank 130 is shown received in sleeve 122. In particular, the tapered tool shank 132 is received against taper sleeve surfaces 128. The tool shank 130 also includes an exterior cap 134 having a pair of diametrically opposed arcuate slots 136 which are spaced apart on opposite sides of the cap and are adapted to receive arcuate flanges 138 formed on the forward end of the tool-driving shaft 70. Flanges 138 and slots 136 are used during tool exchange to ensure proper positioning and orientation of the tool shank and tool-driving shaft relative to one another.

As shown, the tool shank 130 includes a central axial bore 140 for purposes to be described and also a retention knob 142 adapted to be gripped by multiple fingers 144 of the collet 146 disposed in the bore 120 of the tool-driving shaft 70. The collet is connected to a drawbar member 148 by a long machine screw 150 and sleeve 152. Referring to axial bore 140 in the tool shank 130, an elongated stop member 154 is disposed therein and includes a rear end 156 adapted to function, if necessary, as a stop against the end of machine screw 150. The stop member 154 also includes an enlarged cam portion toward the forward portion thereof supporting spring biased balls 160 (only one shown) which engage in an annular groove 162 in tool shank receiving sleeve 122. Ball engagement in groove 162 provides an initial locking action to initially hold the tool shank 130 in the forward end of the tool-driving shaft 70.

As described, the tool shank clamping collet 146 is attached to drawbar member 148 and is slidable therewith in central bore 120 of the tool-driving shaft. The drawbar member is biased or urged to the right (in FIG. 3) by a plurality of annular spring washers 170 positioned around the drawbar member as shown and held together by retainer collar 172 threaded onto the threaded rear end of the drawbar member.

Extending into the rear open end of the tool-driving shaft 70 is a piston rod 174 which includes cam surface 175 near the forward end thereof as shown for purposes to be explained below. The piston rod extends from a double-acting piston member 178 slidably received in cylinder insert 180 in the rear housing section 18. The insert 180 is closed at its rearward end by an insert cap or cover 182 fastened such as by machine screws (not shown) to the cylinder insert 180. Cylinder insert 180 and attached cover 182 together are slidably received in the bore 18a of housing section 18 as shown for purposes to be explained below. The piston member includes an O-ring seal to hydraulically separate the forward side 184 and the rearward side 186. Appropriate oil seals 188 are shown between the insert 180 and insert cap 182 and the rear housing section 18 for oil sealing purposes. Seals 188 prevent oil leakage between cylinder insert 180 and housing section 18, especially as the cylinder insert slides therein. The piston member forms a forward chamber 190 and a rear chamber 192 in insert 180 and each chamber communicates with its own respective oil supply passage 194,196 receiving fluid pressure from appropriate external sources (not shown). The piston member 178 is actuated to slide left (forward) or right (rearward) in FIG. 3 by increasing oil pressure on one side or the other of the piston member. For example, to slide the piston member forward, oil pressure in rear chamber 192 is increased and vice versa. Movement of the piston member of course causes sliding movement of the piston rod 174 relative to the tool-driving shaft 70.

In operation, to release the collet fingers 144 from the tool shank knob 142, the piston rod is slid forward or left in FIG. 3 to engage the rear end of the drawbar member in end-to-end relation and push the drawbar member in a syringe type action in bore 120 to the left until the collet fingers 144 can expand past cam surfaces 126 of circumferential groove 124 in the shank-receiving sleeve 122 at the forward end of the tool-driving shaft 70. The tool shank 130 can then be withdrawn from the sleeve 122 by a suitable tool changer (not shown) compressing locking ball 160.

During the sliding movement of the piston rod 174 in the bore 120 of the tool-driving shaft 70 to release the tool shank, the cam surface 175 thereon engages complementary cam surfaces 281 on multiple fingers 282 of collet 284 for clamping the shaft 70 against movement in the bore 120. Bore 120 includes a circumferential groove 286 positioned to receive the ends of fingers 282 in locking engagement when they are expanded by the camming action of the piston rod 174. At the initiation of clamping, a rearwardly directed axial reaction force between piston rod 174 and drawbar member 148 resulting from engagement therebetween causes cylinder insert 180 to slide slightly rearwardly, causing the rear shoulder 282a of collet fingers 282 to engage the rear shoulder 286a of circumferential groove 286 to thereby clamp the hollow shaft 70 against movement from tool unclamping forces. This reaction force and this shaft clamping persist until the drawbar member and piston rod are disengaged. The shaft clamping collet 284 is fastened at its rear end to slidable cylinder insert 180, in particular to a cylindrical forwardly projecting extension 180a thereof by machine screws (not shown) or other suitable means. Clamping of the shaft 70 in this manner during sliding movement of the piston rod and thus the drawbar member is highly important to minimize axial tool unclamping forces exerted on the antifriction bearings 74,102, which are expensive precision bearings to accommodate shaft speeds of typically 15000 to 30000 r.p.m.

Once the tool shank 130 has been removed from the tool shank receiving sleeve 122 and a new tool shank exchanged therefor and received in the sleeve 122, piston member 178 is slid rearwardly or to the left in FIG. 3 by pressurizing front chamber 190. As the piston member and piston rod 174 slide to the right, the spring washers 170 urge the drawbar member 148 and tool clamping collet 146 to the right and cause collet fingers 144 to be cammed against the tool shank retention knob 142 by camming engagement between cam surfaces 126 and end cam surfaces 145 on the collet finger 144 to grip the retention knob as shown in FIG. 3. In addition, as piston rod 174 moves rearwardly to disengage drawbar member 148, the collet fingers 282 collapse radially inwardly to disengage from groove 286 releasing the clamping force on shaft 70. At the same time, circumferentially spaced coil springs 295 (only one shown) between cover plate 297, which is fastened to housing section 18, and cover 182 cause forward sliding motion of cylinder insert 180 and collet fingers 282, centering the latter relative to groove 286 so that rotation of shaft 70 relative to non-rotating collet fingers 282 can occur without possible engagement. Forward motion of collet fingers 282 is controlled by limiting screw 299 and check nut 300 carried on the cover plate 297.

Before a tool is removed from the tool-driving shaft 70 and before machining after a tool exchange has occurred, it is desirable to confirm these events by sensing means. To this end, the piston rod 174 carries and has attached thereto a pin member 290 movement with the piston rod outside the hollow tool-driving shaft 70 relative to a position proximity sensor 292 mounted in the rear housing section 18, and connected to suitable position indicating display circuitry. In particular, the pin member 290 slides in a space between the collet fingers 282 between the rear position shown in FIG. 3 adjacent sensor 292 forwardly to the position shown in phantom lines. The rear position is sensed and displayed as the "tool clamped" position and the forward position (phantom lines) is sensed as the "tool unclamped" position.

As previously discussed, the forward end of the hollow tool-driving shaft 70 includes opposite disposed circumferentially spaced apart flanges 138 and these flanges are received in corresponding slots 136 in the cap 134 of the tool shank 130 to insure proper alignment therebetween. As shown in FIGS. 3 and 4, a rotary shaft locking mechanism is provided to insure the flanges 138 are properly positioned relative to the incoming tool shank and locked against movement during tool exchange. This shaft locking mechanism includes a cam plate 200 mounted on and rotatable with shaft 70. The cam plate includes a pair of oppositely disposed ramps 202 each terminating in a radial shoulder 204. Carried on the cam plate are a pair of sensed members 206 extending axially toward the rear in FIG. 3. As shown in FIG. 4, a position proximity sensor 208 is positioned in the rear housing section 18 adjacent the cam plate on the rear facing side thereof to sense the location of the sensed members 206. When the cam plate is in position as shown in FIG. 4, the flanges 138 are in the proper orientation to engage in slots 136 in the tool shank caps 134. When sensor 208 senses this position, a lock solenoid 210 mounted in a passage 212 in the rear housing section is actuated. Solenoid 210 includes plunger 214 slidably connected to cam lock member 216 by pin 218 in slot 219. Cam lock member 216 is also pivotally connected to the rear housing section 18 by pin 220 as shown in FIG. 4. Movement of the solenoid plunger 214 outward (toward the bottom of FIG. 4) will cause cam lock member 216 to be pivoted toward shaft 70 to bring cam nose 216a against radial shoulder 204 on the cam plate. At this time, motor rotation or torque on shaft 70 is reversed and maintained to keep the nose 216a and shoulder 204 clamped together. Motor reversal is effected by means of the aforementioned commercially available solid state variable frequency power supply 31. This cam locking action assures the tool-driving shaft 70 and forward flanges 138 are locked in proper orientation to be received in cap slots 134. Locking of either radial shoulder 204 of the cam plate will assure proper orientation of the shaft flanges 138 as effected. Only after solenoid plunger 214 is retracted is the shaft 70 free to rotate. Of course, a suitable control unit (not shown) will receive sensed position signals from sensor 208 and sensor 292 to control actuation of the solenoid 210 and tool changes.

Operation of the spindle described begins by locking the tool-driving shaft 70 with flanges 138 in proper orientation. Sensor 208 assures that the shaft is so locked. Then, piston member 178 is slidably actuated to the left in FIG. 3 by pressurizing rear chamber 192 to push the drawbar member 148 and tool clamping collet 146 to the forward position where collet fingers 144 radially outward into sleeve groove 122. Sensor 292 senses the "unclamp position" and a tool changer (not shown) can remove the tool shank and replace it with another tool shank. Once the replacement tool shank is received in the sleeve of the hollow tool-driving spindle, the piston member is urged to the right in FIG. 3 to withdraw piston rod 174 and at the same time spring washers 170 urge the drawbar member and attached tool clamping collet to the right to cause the collet fingers 144 to be cammed in gripping engagement on the retention knob 142 of the tool shank 130. Sensor 292 senses the clamped position and effects de-activation of the solenoid 210 to withdraw its plunger 214 and release cam lock member 216 from radial shoulder 204 of cam plate 200 and also releases reverse motor torque to free the tool-driving shaft 70 for rotation in the other direction to effect machining.

While the invention has been described by a detailed description of certain specific and preferred embodiments, it is understood that various modifications and changes can be made therein within the scope of the appended claims which are intended also to include equivalents of such embodiments.

I claim:

1. A spindle comprising a housing, a hollow tool-driving shaft rotatably mounted in the housing, tool clamp means slidably disposed in the hollow tool-driving shaft slidable in one direction to grip a tool and in the other direction to release the tool, actuating means in the housing for sliding the tool clamp means in said one direction to grip the tool and in the other direction to release it, said actuating means including piston means slidably disposed in the housing with a portion of said piston means extending inside the tool-driving shaft for sliding the tool clamp means in said tool-driving shaft in said other direction for tool release, said portion having cam means thereon, means for actuating said piston means, means in the tool-driving shaft biasing the tool clamp means in said one direction to grip a tool when said piston means slides in said other direction, and shaft clamping means disposed inside the tool-driving shaft with a portion thereof in the path of said cam means of said piston means so that said cam means moves the shaft clamping means into clamping engagement with the tool-driving shaft from inside the tool-driving shaft when the piston means is slid to cause tool release for preventing movement of the tool-driving shaft from tool release forces.

2. The spindle of claim 1 wherein the piston means is a double acting piston having opposite sides alternately subjected to fluid pressure.

3. The spindle of claim 1 wherein the piston means is slidably received in a cylinder means itself slidably mounted in the housing 4. The spindle of claim 1 wherein the tool clamping means includes a collet with multiple fingers cammed into and out of gripping relation to the tool depending upon the sliding direction of the tool clamping means.

5. The spindle of claim 3 wherein the means for releasably clamping the hollow tool-driving shaft comprises a collet in the housing having fingers held against the tool-driving shaft during tool release to clamp the drive shaft against movement from tool unclamping forces.

6. The spindle of claim 4 wherein the hollow drive shaft includes groove means to receive the ends of collet fingers.

7. The spindle of claim 5 wherein the collet is carried on cylinder means which slidably receives the piston means and itself is slidably mounted in the housing to position the collet fingers in clamping relation against the tool-driving shaft.

8. The spindle of claim 7 wherein the cylinder means is spring-biased to generally center the fingers in spaced relation relative to the groove means when the hollow tool-driving shaft is unclamped.

9. The spindle of claim 1 which further includes means for locking the rotary position of the tool-driving shaft during tool exchange, said means comprising a cam means mounted on the the hollow tool-driving shaft for rotation therewith, a cam lock means movably mounted on the housing and means for engaging the cam lock means with the cam means to lock the rotary position of the hollow tool-driving shaft.

10. The spindle of claim 9 wherein the cam means carries a sensed member and wherein a position sensor is disposed in the housing for sensing the position of the sensed member and thus the tool-driving shaft.

11. The spindle of claim 1 wherein a portion of the piston rod out of the hollow tool-driving shaft carries a sensed member and wherein a position sensor is disposed in the housing to sense the position of the sensed member and thus the piston rod.

12. The spindle of claim 1 wherein the hollow tool-driving shaft includes a driving end having a pair of orienting flanges engageable in slots in a tool shank to properly position the tool on the tool-driving shaft.

13. A spindle comprising a housing, a hollow tool-driving shaft having a longitudinal axis and rotatably mounted in the housing, tool clamping means slidably disposed in the hollow tool-driving shaft slidable axially in one direction to release the tool shank and in another direction to grip the tool shank, cylinder means movably disposed in said housing, piston means slidably disposed in the cylinder means and having a portion extending toward the hollow tool-driving shaft engageable with the tool clamping means for sliding said tool clamping means in said one direction to release the tool shank, means in the hollow tool-driving shaft biasing the tool clamping means in said another direction to grip the tool shank when the piston means is slid in said another direction, means for sliding said piston means, shaft clamping means operatively connected to said cylinder means and extending toward the hollow tool-driving shaft operable by said piston means during sliding thereof in said one direction and by said cylinder means during movement thereof in said another direction when said piston means engages the tool clamping means for releasably clamping the hollow tool-driving shaft against axial movement from tool unclamping forces, and means biasing said cylinder means in said one direction.

14. The spindle of claim 13 wherein the spindle is a motorized spindle having a shank on an end of said housing adapted to be received in the prime spindle of a machining center.

15. The spindle of claim 13 wherein the tool clamping means includes a drawbar member slidably disposed in the hollow tool-driving shaft inside said spring means and biased thereby and a collet with multiple fingers cammed into and out of gripping relation with the tool shank depending upon the sliding direction of the drawbar member.

16. The spindle of claim 15 wherein the shaft clamping means for releasably clamping the hollow tool-driving shaft includes a collet in the housing connected to said cylinder means and including multiple fingers extending inside the hollow tool-driving shaft and cammed into groove means inside the tool-driving shaft by cam surfaces on said piston portion when said piston is slid in said one direction to engage the drawbar member and by movement of the cylinder means in said another direction in reaction to engagement of said piston means with the drawbar member.

17. The spindle of claim 16 wherein the tool-driving shaft includes circumferential groove means to receive the ends of said clamping fingers during clamping engagement.

18. The spindle of claim 16 wherein the cylinder means is spring-biased longitudinally in the housing to generally center the fingers relative to the groove means when the hollow drive shaft is unclamped.

19. The spindle of claim 13 wherein the piston means includes opposite sides alternately subjected to fluid pressure to cause sliding motion thereof in one direction or the other and said piston actuating means includes fluid pressure passages in said housing to provide fluid pressure alternately to said opposite sides and fluid pressure source means external of the spindle.

20. The spindle of claim 13 which further includes means for locking the rotary position of the tool-driving shaft during tool exchange, said means comprising a cam means mounted on the exterior of the hollow tool-driving shaft for rotation therewith, a cam lock means movably mounted on the housing and means for engaging the cam lock means with the cam means to lock the rotary position of the hollow tool-driving shaft.

21. The spindle of claim 20 wherein the cam means carries a sensed member and wherein a position sensor is disposed in the housing for sensing the position of the sensed member and thus the tool-driving shaft.

22. The spindle of claim 13 wherein said piston portion includes a sensed member carried outside the tool-driving shaft and wherein a position sensor is disposed in the housing to sense the position of the sensed member and thus said piston means.

23. The spindle of claim 1 wherein the hollow tool-driving shaft includes a driving end having a pair of orienting flanges.

* * * * *